United States Patent [19]
Yeo

[11] Patent Number: 6,026,147
[45] Date of Patent: Feb. 15, 2000

[54] SYSTEM AND METHOD FOR SUPERVISING CALLS IN THE EXCHANGE

[75] Inventor: Nam Soo Yeo, Kyunggi-do, Rep. of Korea

[73] Assignee: LG Information & Communications, Ltd., Seoul, Rep. of Korea

[21] Appl. No.: 09/090,238

[22] Filed: Jun. 4, 1998

[30] Foreign Application Priority Data

Jun. 18, 1997 [KR] Rep. of Korea .................. 97-25572

[51] Int. Cl.$^7$ .................................................. H04M 1/24
[52] U.S. Cl. ................................................................. 379/35
[58] Field of Search ........................... 379/7, 9, 10, 18, 379/34, 198, 201, 6, 12, 22, 26, 35, 29, 265, 266, 309

[56] References Cited

U.S. PATENT DOCUMENTS

| | | | |
|---|---|---|---|
| 4,456,788 | 6/1984 | Kline et al. ................................ | 379/34 |
| 4,581,493 | 4/1986 | Gazzo et al. ............................... | 379/12 |
| 5,222,083 | 6/1993 | Khouri et al. ............................. | 379/29 |
| 5,351,287 | 9/1994 | Bhattacharyya et al. ................. | 379/35 |
| 5,353,326 | 10/1994 | Jung .......................................... | 379/6 |
| 5,392,328 | 2/1995 | Schmidt et al. .......................... | 379/22 |
| 5,461,622 | 10/1995 | Hanai ........................................ | 379/9 |
| 5,469,493 | 11/1995 | Kenyoshi .................................. | 379/9 |
| 5,566,223 | 10/1996 | Taguchi .................................... | 379/34 |
| 5,590,171 | 12/1996 | Howe et al. ............................... | 379/6 |
| 5,623,498 | 4/1997 | Pannone ................................... | 379/29 |
| 5,737,390 | 4/1998 | Mano ........................................ | 379/10 |
| 5,790,635 | 8/1998 | Dezonno ................................... | 379/34 |
| 5,790,798 | 8/1998 | Beckett, II et al. ...................... | 379/35 |
| 5,802,145 | 9/1998 | Farris et al. .............................. | 379/22 |
| 5,832,059 | 11/1998 | Aldred et al. ............................ | 379/265 |
| 5,835,565 | 11/1998 | Smith et al. .............................. | 379/6 |
| 5,835,566 | 11/1998 | Cowgill .................................... | 379/10 |
| 5,850,426 | 12/1998 | Watkins et al. ........................... | 379/29 |
| 5,867,558 | 2/1999 | Swanson ................................... | 379/34 |
| 5,881,132 | 3/1999 | O'Brien et al. .......................... | 379/35 |
| 5,883,945 | 3/1999 | Richardson, Jr. et al. ............... | 379/35 |
| 5,914,951 | 6/1999 | Bentley et al. ........................... | 379/265 |
| 5,920,611 | 7/1999 | Howell ...................................... | 379/35 |
| 5,923,746 | 7/1999 | Baker et al. .............................. | 37/265 |
| 5,930,335 | 7/1999 | Kim ........................................... | 379/35 |
| 5,930,344 | 7/1999 | Relyea et al. ............................. | 379/34 |
| 5,940,472 | 8/1999 | Newman et al. ......................... | 379/9 |
| 5,946,373 | 8/1999 | Harris ........................................ | 379/26 |
| 5,946,375 | 8/1999 | Pattison et al. .......................... | 379/265 |

*Primary Examiner*—Paul Loomis
*Assistant Examiner*—Rexford Barnie
*Attorney, Agent, or Firm*—Fleshner & Kim

[57] ABSTRACT

A call supervisory system in the exchange includes: a trunk card device (TCD) connected to a trunk card of an external system via a control trunk line (CTL); a device control unit (DCU), as a lower level processor, for controlling the TCD; a man machine interface unit (MMIU) matched with the external system for switching data and managing a password; a call trace and path setup control unit (CTCU) for controlling the call supervisory system according to demands of the external system received through the MMIU and informing a result of the relevant control to the external system via the MMIU; a number translation unit (NUTU) for translating and managing the exchange number when processing calls according to the control of the CTCU; a call trace and path setup unit (CTSU) for setting up call supervision and a call path according to the control of the CTCU; a call management unit (CMU) for performing a call process function of the exchange, sending a call supervision control flag to NUTU, and informing occurrence of call process events to the CTSU; a fault control unit (FACU) for controlling fault in the call supervisory system and informing contents of the fault to the external system via the MMIU; and a telephony device maintenance unit (TDMU) for controlling maintenance and repair of speech path equipment according to the control of the FACU.

20 Claims, 8 Drawing Sheets

SYSTEM AND METHOD FOR SUPERVISING CALLS IN THE EXCHANGE

FIELD OF THE INVENTION

The present invention relates to monitoring and tapping of calls in the exchange and, in particular, to a system and method for monitoring and tapping calls by a function of the exchange itself.

BACKGROUND OF THE INVENTION

A conventional exchange does not have a call supervisory system performed by a function of the exchange itself. Conventionally, technology of call monitoring and tapping is embodied in a manner that connects lines in a physical speech path in parallel, but there does not exist a function of monitoring and tapping calls according to a control of a relevant exchange itself. The function of monitoring and tracking subscriber's calls exists just for maintenance and repair of the exchange, and the function of tapping the calls exists just for testing a subscriber line. The two functions generally exist individually.

Each conventional function has been developed just for maintenance and repair of the exchange, which does not satisfy an objective of the call supervisory system for performing call tracking, call monitoring and call tapping through one connected functional operation. In addition, the conventional call tracking function does not have a feature of tracking calls of prefix which is required in the call supervisory system, and the conventional call monitoring function cannot perform the call tapping function simultaneously when the call is made. The conventional call tapping function cannot be performed without use of a test device, and a single test device allows tapping only one per 4096 subscribers. This causes a capacity problem, and the conventional art does not allow both call monitoring and call tapping functions to be performed simultaneously.

After all, in the conventional exchange, the call supervising function is performed only on the speech path, and there does not exist the call supervisory system falling under a function of the exchange itself.

SUMMARY OF THE INVENTION

Accordingly, the present invention is directed to the call supervisory system and method in the exchange that substantially obviates one or more of the limitations and disadvantages of the related art.

An objective of the present invention is to provide the call supervisory system and method in the exchange for performing the call monitoring and tapping through a function of the exchange itself. Specifically, unlike a conventional tapping technology which performs in a manner that an external apparatus directly occupies a line, the present invention is designed to continuously process each call monitoring, call tapping, and call tracking through one connected functional operation.

Another objective of the present invention is to provide the call supervisory system and method in the exchange that performs the call monitoring and tapping functions by applying or combining functions of the exchange itself, without modification in a network or addition of special devices, in the case that the call monitoring and tapping is necessary in a public network for a special purpose.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, the call supervisory system in the exchange Includes: a trunk card device connected to a trunk card of an external system via a control trunk line; a device control unit, as a lower level processor, for controlling the trunk card device; a man machine interface unit matched with the external system for switching data and managing a password; a call trace and path setup control unit for controlling the call supervisory system according to demands of the external system received through the man machine interface unit and informing a result of the relevant control to the external system via the man machine interface unit; a number translation unit for translating and managing the exchange number according to the control of the call trace and path setup control unit when processing calls; a call trace and path setup unit for setting up call supervision and a call path according to the control of the call trace and path setup control unit; a call management unit for performing a call process function of the exchange, sending a call supervision control flag to the number translation unit, and informing occurrence of call process events to the call trace and path setup unit; a fault control unit for controlling fault in the call supervisory system and informing contents of the fault to the external system via the man machine interface unit; and a telephony device maintenance unit for controlling maintenance and repair of speech path equipment according to the control of the fault control unit.

In another aspect, the present invention provides the call supervisory method in the exchange includes the steps of: checking whether the call supervisory system is operative in response to an operation starting command signal; grouping control trunk lines (CTL) into specified CTL units according to a grouping command signal; identifying registration/non-registration and conformity/unconformity of each call supervised object and performing registration, removal, change of information, or inquiry with respect to each call supervised object; and performing the call monitoring and tapping with respect to each call supervised object.

Functions of the call supervisory system are largely classified into a function of processing matching with the external system and an internal function of the call supervisory system. Matching with the external system, data transmission protocol, data format definition, and various message definitions may be variable according to user of the external system. Data transmission between the external system and the call supervisory system may be performed through data link using an X.25 protocol and a CTL may be used as a speech transmission line for call tapping.

This invention is designed to perform the call monitoring and tapping through a control function of the exchange itself using a conference talking circuit which a general exchange has for a basic exchange service without necessity of special hardware equipment for performing the call supervision.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings. With reference to the accompanying drawings, the present invention will now be described.

Figure 1:
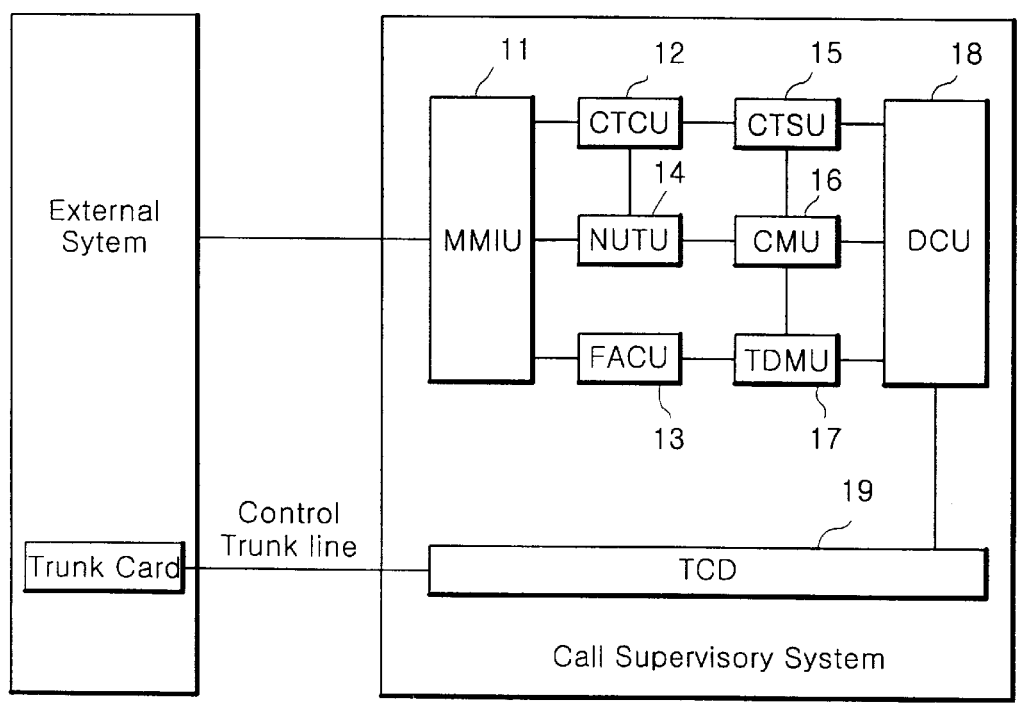
FIG. 1 is a block diagram of the call supervisory system in the exchange according to a preferred embodiment of the present invention.

As shown in FIG. 1, the call supervisory system in the exchange according to an embodiment of the present invention comprises a man machine interface unit (MMIU) 11, a call trace and path setup control unit (CTCU) 12, a fault control unit (FACU) 13, a number translation unit (NUTU) 14, a call trace and path setup unit (CTSU) 15, a call management unit (CMU) 16, a telephony device maintenance unit (TDMU) 17, a device control unit (DCU) 18, and a trunk card device (TCD) 19.

The MMIU 11 is matched to an external system with a data link using an X.25 transmission protocol for data transmission. The MMIU 11, in response to an operation starting command signal received from the external system, registers a password in a local memory and sets up an operating flag. In response to a password changing command signal received from the external system, the MMIU 11 newly registers a new password in the local memory and informs a relevant result. The MMIU 11 switches a grouping command signal, a command signal related to a call monitored and tapped object, a call tapping command signal, and a call tapping cancellation signal received from the external system. The MMIU 11 also informs information received from the CTCU 12 and FACU 13 to the external system.

The CTCU 12 controls the operation of the call supervisory system according to the signal received through the MMIU 11 and informs a result of the relevant control to the external system via the MMIU 11.

The FACU 13, which operates in response to the operation starting command signal received via the MMIU 11, detects fault of a system so as to control the TDMU 17 and informs contents of the fault in the relevant system to the external system via the MMIU 11.

The NUTU 14 performs exchange number translation and management during a call process according to control of the CTCU 12 and, more specifically, performs registration, change, and removal of a prefix to be call-supervised in a number translation processor (NTP) database.

The CTSU 15 sets up the call supervision and a call path according to a control signal of the CTCU 12. So to speak, The CTSU 15 performs registration, change and removal of general subscribers to be call-supervised in a switching subsystem processor (SSP) database. Also, The CTSU 15 allocates a call mixer, CTL, and switch resource so as to perform call tapping and requires reforming for a call of the call mixer to the CMU 16.

The CMU 16 performs a call process function of the exchange. The CMU 16 reforms the call of the call mixer according to a demand of the CTSU 15, checks a call supervision registration flag, and informs information related to occurrence of a call process event to the CTCU 12 via the CTSU 15.

The TDMU 17 controls maintenance and repair of speech path equipment according to the control of the FACU 13.

The DCU 18, as a processor of a lower level, controls the TCD 19 according to a demand of occupying devices, such as a trunk, call mixer, subscriber equipment, signal equipment, trunk switching resources, and so on and cancellation of the demand.

The TCD 19 is matched with the CTL. The TCD 19 sets up a speech path according to the control of the DCU 18.

In response to the demand of performance of functions from the external system, such as personal computer (PC) and cathode-ray tube (CRT), the call supervisory system in the exchange according to the embodiment of the present invention performs the functions including starting and ending of the system, change of a password, grouping and inquiry of CTL, the registration, removal, change of information, and inquiry with respect to objects to be call monitored and tapped, call monitoring and tapping, cancellation of the call tapping, and break of message transmission. The call supervisory system in the exchange according to the present invention also informs a call monitored and tapped result, informs fault in the exchange, and performs the exchange software restarting function where it informs an operable status of the exchange when the exchange restarts the operation. Here, the call supervised objects are transmitting signals or receiving signals of subscribers that fall under the relevant call supervisory system and transmitting signals of subscribers that fall under other exchanges. Each subscriber of the relevant call supervisory system is registered as a subscriber telephone number, and each subscriber of the other exchanges is registered as a pre-defined number defined by a telephone number, prefix or the others. There are many ways for performing the call tapping, and it may be performed using conference talking equipment used in two-party talking service and conference talking service which belong to the functions of the exchange itself.

The call supervisory system in the exchange according to the embodiment of the present invention uses an X.25 as data transmission protocol between the external system and the exchange, whereby contents demanded from the external system to the exchange are represented by command signals and contents transmitted from the exchange to the external system are represented by messages during interface. Here, the contents of each command signal consist of a header and contents of command. The header contains an identification number of the call supervisory system, length of the contents of command of bytes, command code, and password. The contents of each message consist of a header and contents of command. The header contains an identification number, length of the contents of command of bytes, and message code. A header format of call supervisory information in the message includes a call identifier for discriminating between calls. Each call identifier is properly given to each subscriber or each prefix when the external system registers the subscribers or prefixes for the call supervision. A call number is a numerical value resulting from counting calls of subscribers or prefixes at the exchange.

Figure 2:
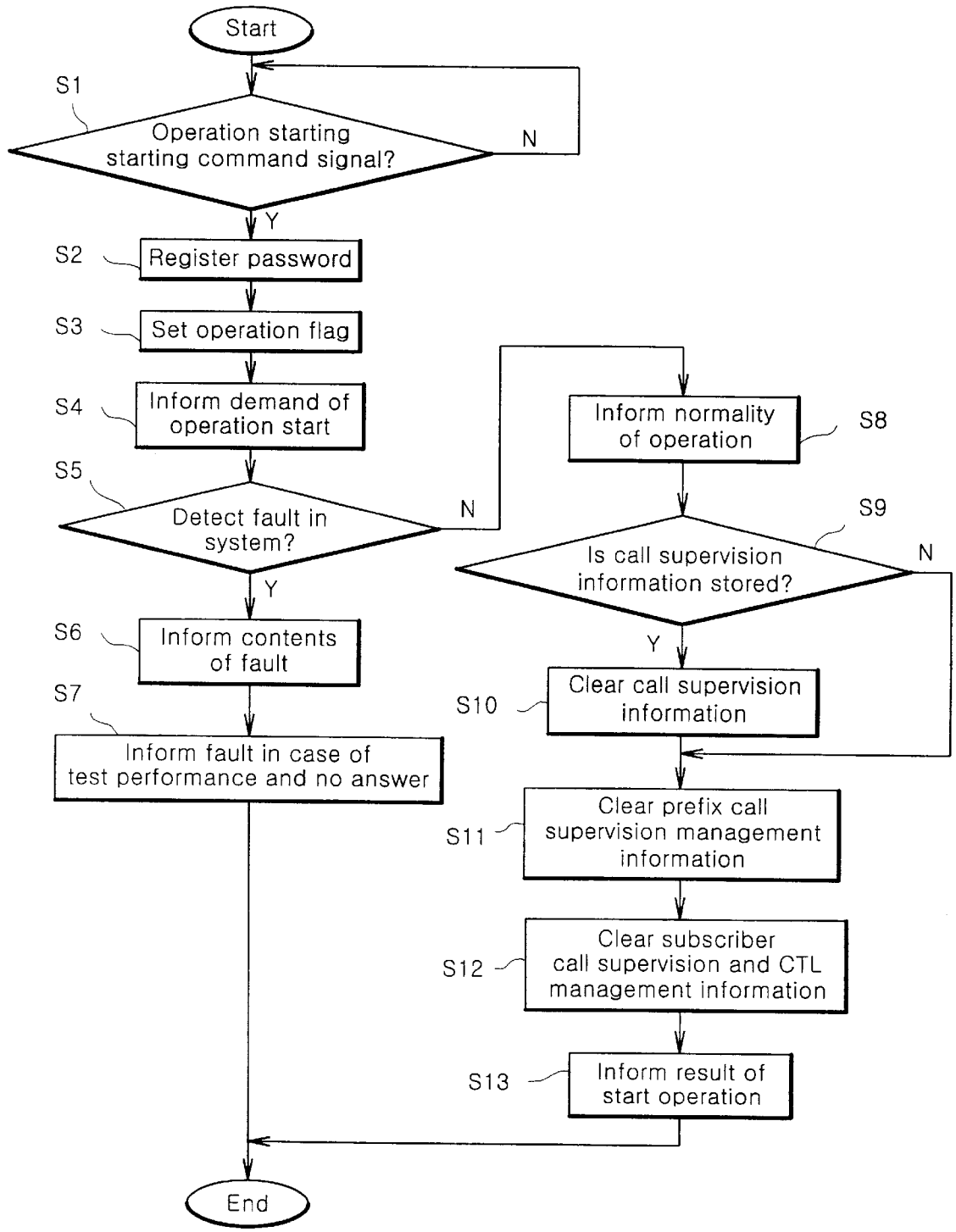
FIG. 2 is a flow chart showing an operation start of the call supervisory system in the exchange according to a preferred embodiment of the present invention.

The starting operation of the call supervisory system will now be described with reference to the flow chart shown in FIG. 2. When the external system demands starting of the operation after initial setup of the exchange, demands restart after a demand of ending the operation, demands starting of the operation after the exchange is down because of fault in the exchange, or demands according to other necessities of the external system, the call supervisory system starts its operation.

In other words, the MMIU 11 internally installed in the call supervisory system matched with the external system checks whether the operation starting command signal demanding the start of the call supervisory system is received to the call supervisory system from the external system (step S1). If the MMIU 11 receives the operation starting command signal from the external system at the step S1, it registers a password in the local memory after initialization necessary for the operation of the call supervisory system (step S2). It sets the operation flag of the call supervisory system (step S3), and then informs the start of the call supervisory system to the CTCU 12 for performing the call monitoring, tracing, and tapping functions and the FACU 13 for processing of fault and state management in the call supervisory system (step S4).

The FACU 13 receives the start information of the system operation from the MMIU 11 and detects fault in hardware or software of the call supervisory system (step S5). If the fault in the call supervisory system is detected, the FACU 13 informs details of the initial fault via MMIU 11 to the external system (step S6). On the other hand, the CTCU 12 informs the fault in the system via the MMIU 11 to the external system in case where each block performs an answer back test or there is no answer from each block (step S7). If there is no details of the initial fault detected by the FACU 13 at step S5, that is, the MMIU 11 receives no details of the fault from the FACU 13 because the fault does not occur in the call supervisory system, the FACU 13 informs via the MMIU 11 to the external system the fact that the operation start of the call supervisory system is normally performed (step S8). The CTCU 12 checks whether the call supervisory information is stored in its memory (step S9). If the memory currently stores the call supervisory information in the call supervisory system, the CTCU 12 clears the memory (step S10). The CTCU 12 also sends a clear command signal to the respective NUTU 14 and CTSU 15 so as to control the operation.

The NUTU 14 checks whether the call supervisory information about a prefix is stored in a relevant management memory and then clears the memory (step S11). The CTSU 15 checks whether information referenced to subscriber's call supervision and CTL is stored in a relevant management memory and then clears the memory (step S12). After completion of clearing the corresponding management memories, the NUTU 14 and CTSU 15 informs the completion to the CTCU 12. The CTCU 12 informs via the MMIU 11 to the external system the fact that the call supervisory system is ready to receive the call supervision registration demanded from the external system (step S13).

Figure 3:
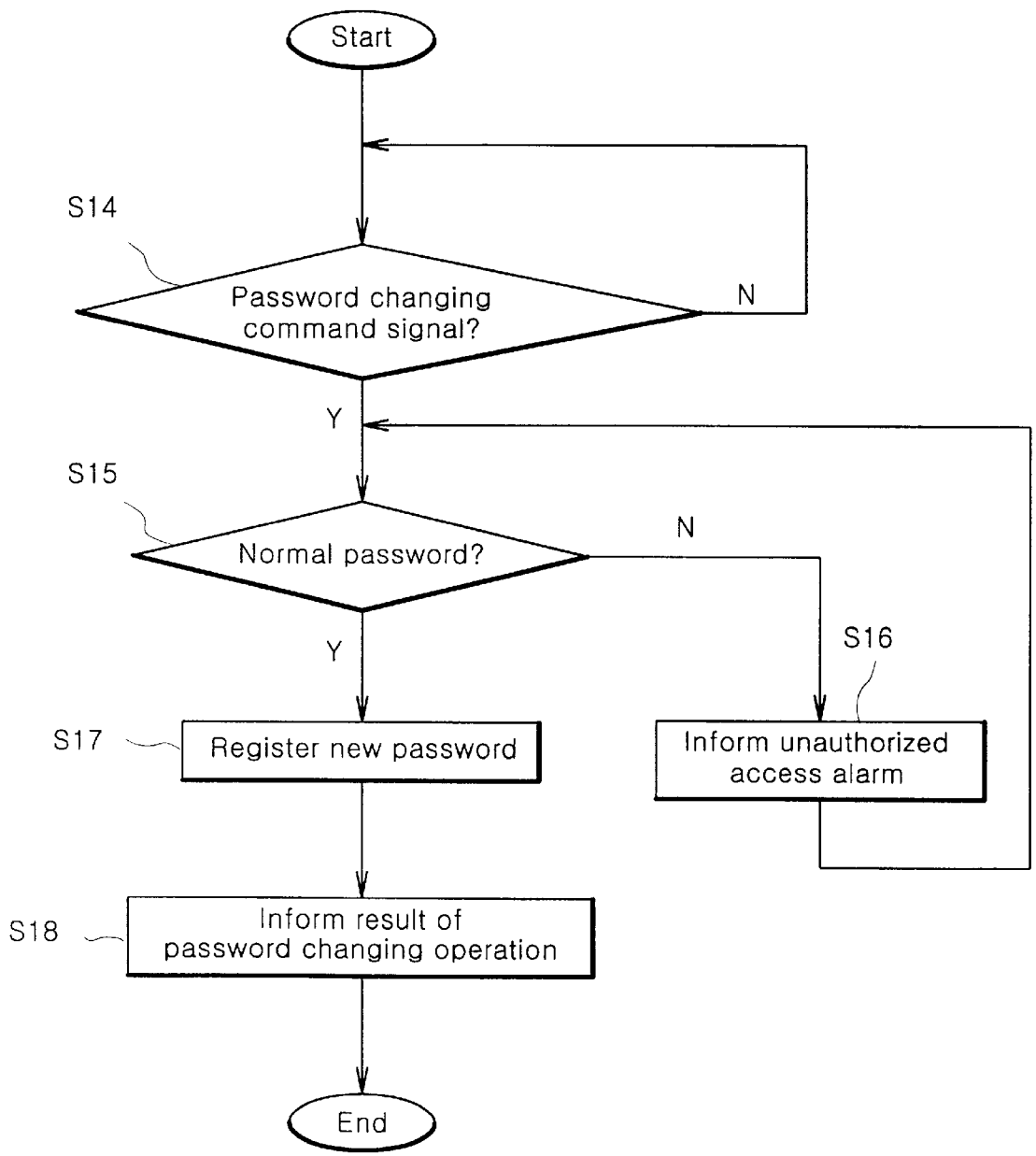
FIG. 3 is a flow chart showing operation of changing a password by the call supervisory system in the exchange according to a preferred embodiment of the present invention.

The operation for changing a password of the call supervisory system will now be described with reference to the flow chart shown in FIG. 3. The MMIU 11 receives from the external system a password change command signal demanding change of the password of the call supervisory system, whereby the call supervisory system performs operation for changing its password (step S14).

When the call supervisory system receives the password change command signal from the external system at step S14, the MMIU 11 compares the password in a header of the password change command signal received from the external system to the password which has been registered in the local memory (step S15).

If the received password is different from the password in the local memory, the MMIU 11 informs an unauthorized access alarm to the external system (step S16). Alternatively, if the two passwords accord with each other, the MMIU 11 newly registers a new password contained in the contents of command of the password change command signal received from the external system in the local memory (step S17) and informs a result of change of the password in the call supervisory system to the external system (step S18).

Figure 4:
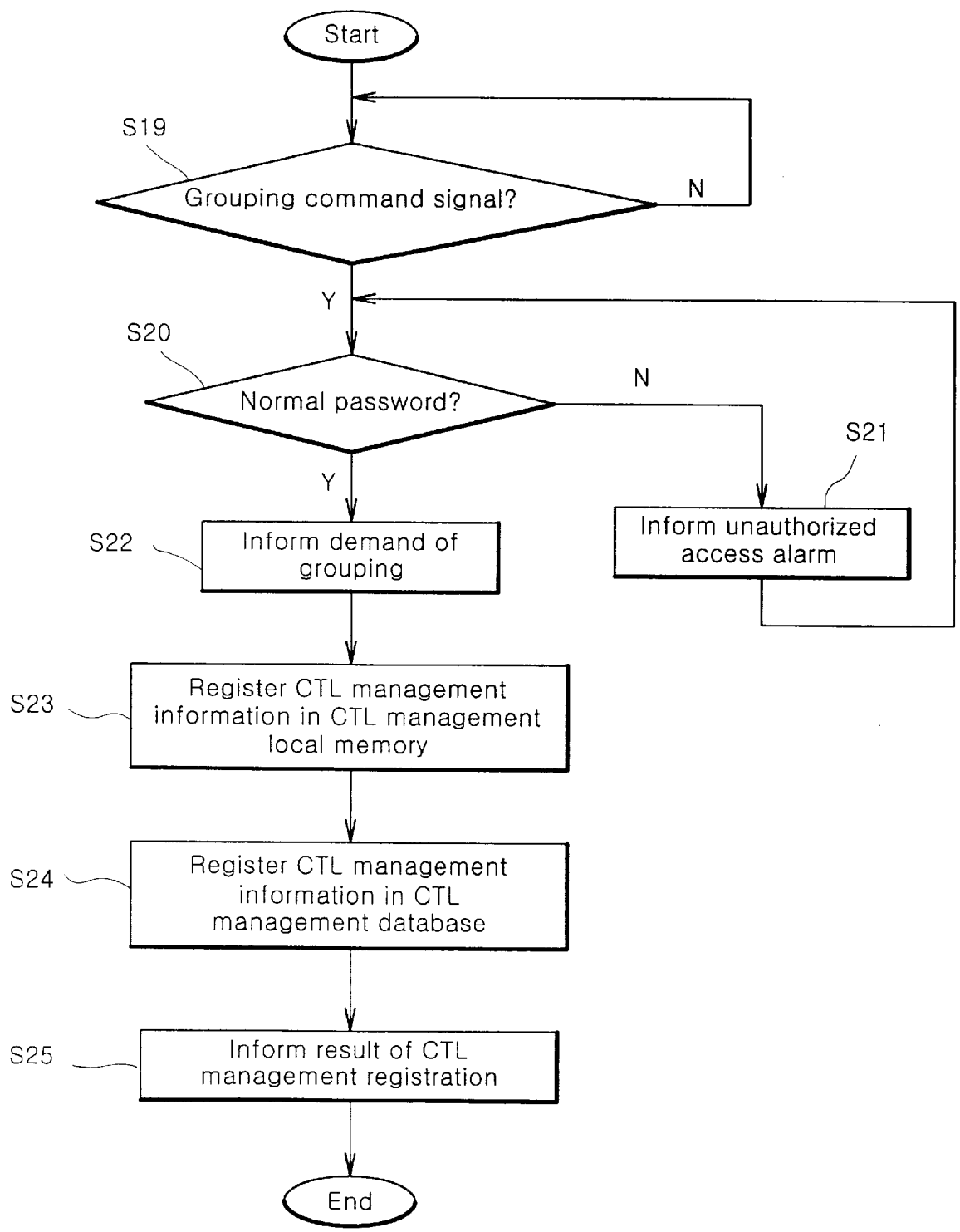
FIG. 4 is a flow chart showing operation of CTL grouping by the call supervisory system in the exchange according to a preferred embodiment of the present invention.

With reference to the flow chart shown in FIG. 4, the CTL grouping operation of the call supervisory system will now be set forth in the following description. When there is a demand by a necessity of the external system, each CTL may be allocated to a predetermined group. Each CTL can be grouped into each predetermined CTL unit at the time of the initial setup of the exchange or can be generated, removed, merged, or separated when necessary during the operation. The external system allocates a registered object to be call-supervised to a specified CTL group, and the call supervisory system stores the CTLs and CTL groups in the local memory in order to use the line in the relevant CTL groups when tapping calls.

In other words, the MMIU 11 checks whether the grouping command signal demanding grouping of the CTLs is received to the call supervisory system from the external system (step S19). If the call supervisory system receives the grouping command signal from the external system at step S19, the MMIU 11 compares the password in a header of the grouping command signal received from the external system to the password which has been registered in the local memory (step S20).

If the received password is different from the password in the local memory, the MMIU 11 informs the unauthorized access alarm to the external system (step S21). Alternatively, if the two passwords accord with each other, the MMIU 11 informs the CTL grouping demand of the call supervisory system to the CTCU 12 (step S22). Here, the contents of command of the grouping command signal received from the external system can be expressed such as CTL_A_NO, CTL_B_NO, and CTL_Group_NO.

The CTCU 12 registers the CTL grouping demand in a CTL management local memory and applies a control signal for the CTL grouping to the CTSU 15 (step S23).

The CTSU 15 registers CTL management information in a CTL management database according to the control signal from the CTCU 12, for example, CTL_A and CTL_B are grouped into CTL_Group (step S24). Then, the CTSU 15 informs completion of the registration of the CTL management information to the CTCU 12, and the CTCU 12 informs a result of the registration of the CTL management information in the call supervisory system via the MMIU 11 to the external system (step S25).

On the other hand, when there is a demand by necessity of the external system, or when a CTL number in a specified CTL group is inquired, the call supervisory system transmits all the CTLs contained in the inquired CTL group in the local memory to the external system.

Figure 5:
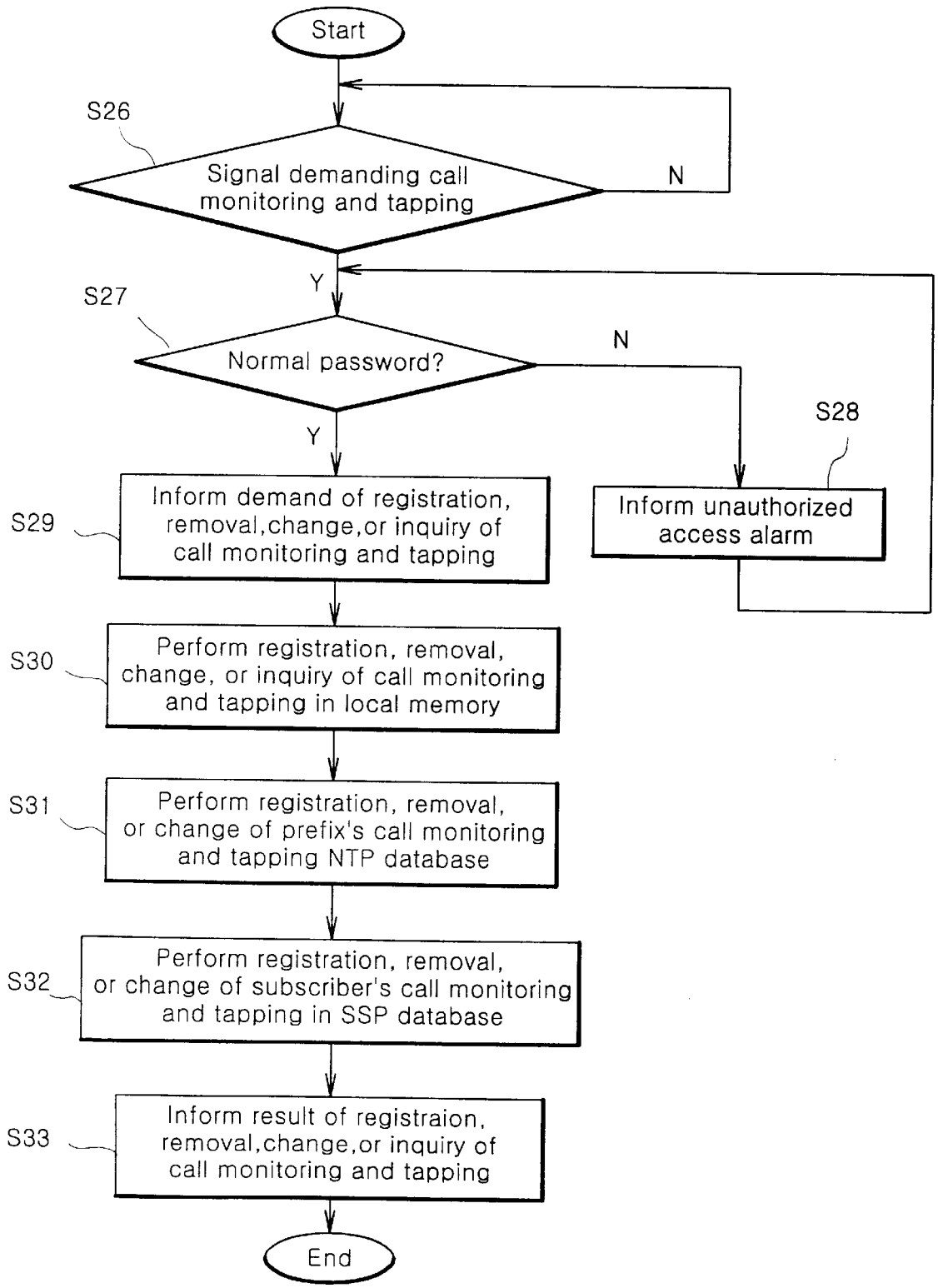
FIG. 5 is a flow chart showing operation of registration, removal, change of information and inquiry with respect to a call monitored and tapped object by the call supervisory system in the exchange according to a preferred embodiment of the present invention.

With reference to the flow chart shown in FIG. 5, the operation of registration, removal, change of information, or inquiry with respect to a call monitored and tapped object in the call supervisory system will now be described. The registration of each call monitored and tapped object is performed by a necessity of the external system, when transmitting a list of supervised objects previously registered in a database of the external system during initial setup of the exchange, or when registering an additional supervised object during the operation. The contents of the command signal for registration of the call monitored and tapped object includes a type of the registered object for discriminating between subscribers for the relevant call supervisory system and external subscribers, a conditional number which is an identifier for discriminating the object from the other registered objects, digit(s) of a telephone number or a prefix, call supervision control method, a CTL group number to be used when tapping calls, and the priority order.

On the other hand, the operation for removing each call monitored and tapped object is performed by a necessity of the external system, or when the external system determines that the supervision is not necessary any more during the operation. Contents of a command signal for removal of the call monitored and tapped object contains a type of the registered object, conditional number, and digit(s).

The operation for changing the information about each call monitored and tapped object is performed by a necessity of the external system, or when intending to change a supervision control method for the supervised object which has been registered previously. Contents of a command signal for changing the information about the call monitored and tapped object contains a type of the registered object, conditional number, digit(s), call supervision control method, CTL group number, and priority order.

The operation for inquiring each call monitored and tapped object is performed by a necessity of the external system, when identifying the contents of the registered supervised object, such as registration/non-registration, a registration type, and supervision control method, or when identifying a registration/non-registration status before registering or removing the supervised object. Contents of a command signal for inquiring the call monitored and tapped object contains a type of the registered object and conditional number. Contents of a message transferred to the external system contain a type of the registered object, conditional number, digit(s), call supervision control method, CTL group number, and priority order.

Specifically, the MMIU 11 checks whether a command signal for demanding registration, removal, change of information, or inquiry with respect to each call monitored and tapped object is received from the external system (step S26). If the call supervisory system receives the command signal related to the call monitored and tapped object from the external system at step S26, the MMIU 11 compares the password in a header of the command signal related to the call monitored and tapped object received from the external system to the password registered in the local memory (step S27).

When the received password is different from the password in the local memory, the MMIU 11 informs an unauthorized access alarm to the external system (step S28). When the two passwords accord with each other, the MMIU 11 informs to the CTCU 12 the demand of registration, removal, change of information, or inquiry with respect to each call monitored and tapped object of the call supervisory system (step S29).

According to the demand of the external system, the CTCU 12 then performs the registration, removal, change of the information, or inquiry in the call monitoring/tapping management local memory with respect to information such as a registration format, registration types of each subscriber or prefix, proper registration number, the subscriber's telephone number or prefix, registration rank in monitoring or monitoring and tapping, registration priority order, and CTL in tapping (step S30). The CTCU 12 also sends to the NUTU 14 and CTSU 15 a control signal over the registration, removal, change of information, or inquiry with respect to the call monitored and/or tapped object.

The NUTU 14, according to the control signal of the CTCU 12, performs registration, change of information, or removal with respect to the call supervised prefix in a database (step S31). The CTSU 15, according to the control signal of the CTCU 12, performs registration, change of information, or removal with respect to the subscriber to be call-supervised in a database (step S32). The NUTU 14 and CTSU 15 inform completion of the registration, change of information, or removal of the call supervised object to the CTCU 12. The CTCU 12, in turn, informs a result of the registration, removal, change of information, or inquiry with respect to the call monitored and/or tapped object to the external system via the MMIU 11 (step S33).

The operations by each function will now be illustrated much more in detail. When registering the call supervised object, the call supervisory system registers the object not only in the local memory but also in a call process database in order to allow the CMU 16 to refer it when processing calls. For subscribers registered in the relevant call supervisory system, the registration is performed after checking conformity/unconformity and registration/non-registration of each subscriber. For subscribers registered in the other systems, each subscriber is registered in the local memory and the database of the NUTU 14 as an object of call supervision after check of conformity of its prefix. In addition, in case of occurrence of another subscriber's call, if the call resorts to the subscriber who has been registered in the relevant local memory, the call supervisory system transmits the call supervisory information to the external system. In the removing operation, the call-supervised object is removed from the call process database and NUTU 14's database as well as from the local memory. In the information changing operation, the call supervisory system changes the contents stored in the local memory after checking the conformity of the supervised object. In the inquiring operation, the call supervisory system reads from the local memory and transmits to the external system, the information on the supervised object to be inquired.

Figure 6:
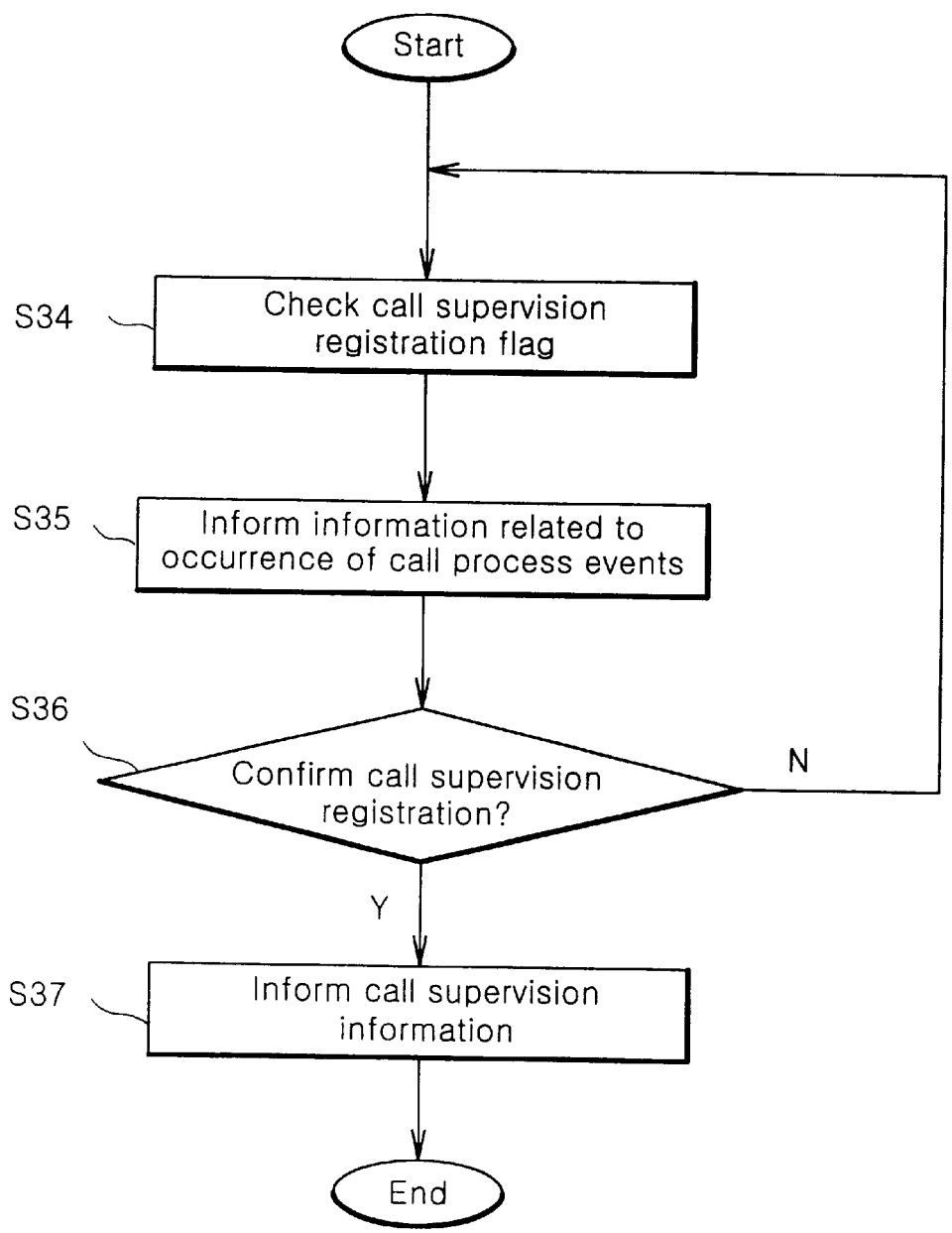
FIG. 6 is a flow chart showing operation of call monitoring by the call supervisory system in the exchange according to a preferred embodiment of the present invention.

Referring to the flow chart shown in FIG. 6, the operation for monitoring calls by the call supervisory system will now be described. This operation is performed when there occur calls belonging to the monitored objects which has been registered previously.

In other words, the CMU 16 performs exchange's call process with respect to hook-off, setup, answer, and disconnection occurred in case of transmitting or receiving calls, and after dial and abnormal status occurred in case of receiving calls which are related to occurrence of call process events which commences the call monitoring. Specifically, the CMU 16 checks a call monitoring registration flag (step S34) and informs information about the occurrence of each call process event via the CTSU 15 to the CTCU 12 (step S35).

The CTCU 12 inquires a subscriber telephone number or prefix from the local memory and identifies registration/non-registration for the subscriber monitoring calls, thereby to perform the operation only when the subscriber has been registered in the local memory as the monitoring call (step S36). If the subscriber is registered as a call monitoring object, the call supervisory system informs via the MMIU 11 to the external system the call supervisory information by events, such as a registration type of the subscriber or prefix, proper registration number, telephone number of the subscriber of the transmitting/receiving call, rank and priority order of the registration, CTL, and time when each event occurred (step S37).

Figure 7:
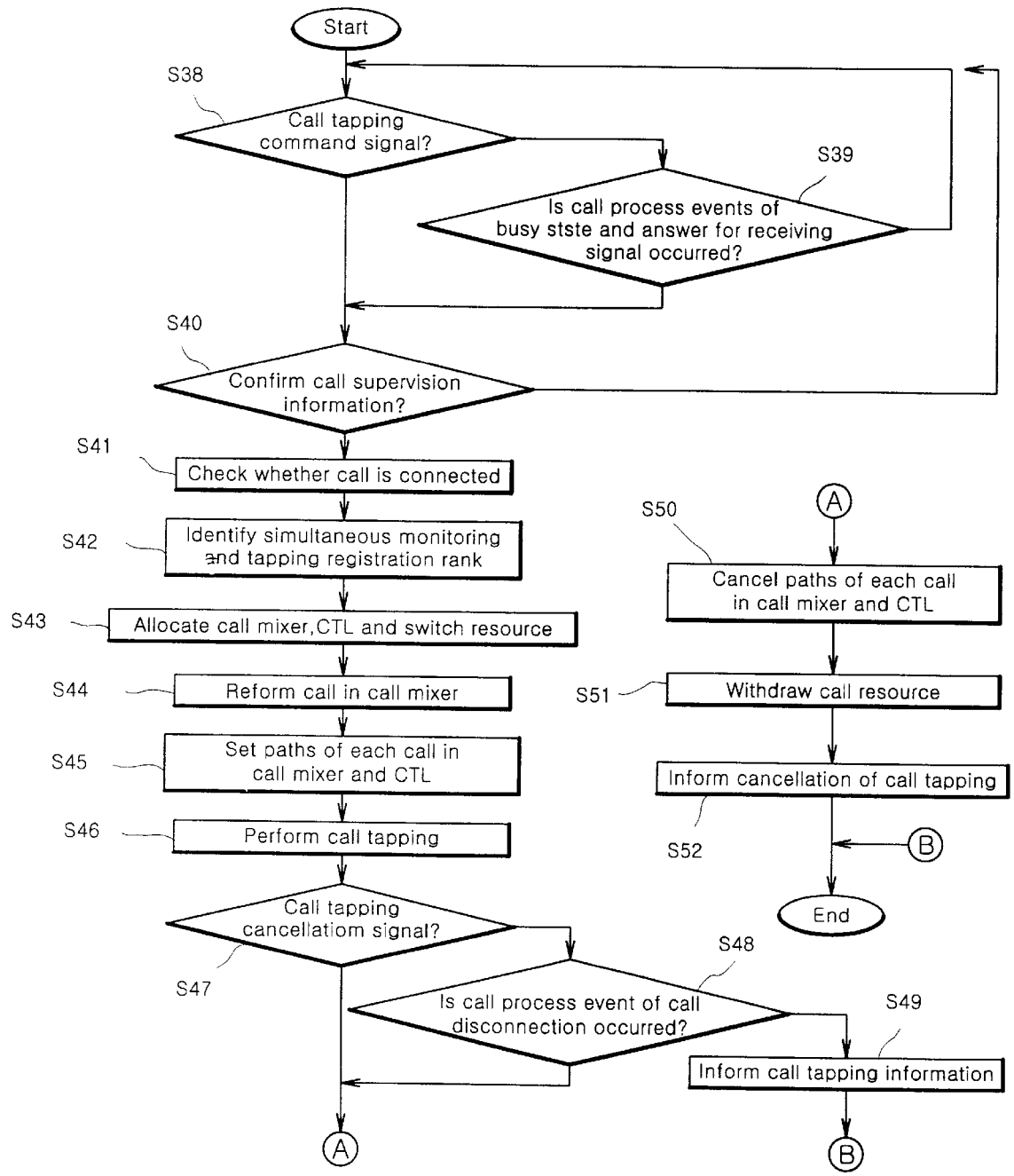
FIG. 7 is a flow chart showing operation of call tapping by the call supervisory system in the exchange according to a preferred embodiment of the present invention.

With reference to the flow chart shown in FIG. 7, the operation for tapping calls by the call supervisory system will now be described. This operation is performed according to a necessity of the external system or the necessity of tapping the supervised objects that are registered based upon statistical control.

Specifically, the CTCU 12 checks whether a call tapping command signal demanding call tapping is received from the external system via the MMIU 11 (step S38). Contents of the call tapping command signal contain a call identifier.

If the call supervisory system does not receive the call tapping command signal from the external system at step S38, the CTCU 12 checks whether information related to call process events such as busy state of a call and answer for an receiving call is received from the CMU 16 (step S39). If the CTCU 12 receives the call tapping command signal at step S38 or the information related to call process events such as busy state of a call and answer for an receiving call at step S39, the CTCU 12 inquires the local memory to find registration/non-registration for call tapping of a subscriber of the relevant call (step S40), thereby to perform the tapping operation only when the subscriber of the relevant call is registered for the call tapping. The CTCU 12 then checks whether or not the call is connected (step S41) and checks a simultaneous monitoring and tapping registration rank (step S42), thereby to perform automatic tapping during the call connection only when the supervision registration rank is registered as the simultaneous monitoring and tapping. The CTCU 12 sends a control signal over the demand of the tapping to the CTSU 15.

The CTSU 15, according to the control signal, allocates a call mixer, CTL, and switch resource (step S43) and demands reconstruction for a call of the call mixer to the CMU 16.

The CMU 16 reconstructs the call in the call mixer according to the demand of the CTSU 15 (step S44) and informs a result of the reconstruction of the call to the CTSU 15.

The CTSU 15 sets up paths of the calls of the call mixer and CTL (step S45) and performs the call tapping (step S46). The path of the relevant call is set up in a manner of a three-party call using the conference talking equipment. Also, the path of the relevant call is set up as a one way path not to allow signals from the external system to be transmitted to a subscriber of the call which is connected.

The operation for canceling the call tapping is performed according to a necessity of the external system or when stopping the tapping in process. The CTCU 12 checks whether a call tapping cancellation command signal demanding cancellation of call tapping is received from the external system via the MMIU 11 (step S47). Contents of the call tapping cancellation command signal include a call identifier and CTL number (for example, CTL_A_NO and CTL_B_NO).

If the call supervisory system does not receive the call tapping cancellation command signal from the external system at step S47, the CTCU 12 checks whether the information related to the occurrence of a call process event for disconnection of the call is received by the CMU 16 (step S48).

If the call tapping cancellation command signal is not received to the call supervisory system at step S47, or if the CTCU 12 does not receive the information related to the occurrence of the call process event for the call disconnection at step S48, the CTSU 15 continuously performs the call tapping, and the CTCU 12 informs the information about the call tapping to the external system through the MMIU 11 (step S49). If the call tapping cancellation command signal is received to the call supervisory system at step S47, or if the CTCU 12 receives the information related to the occurrence of the call process event for the call disconnection at step S48, the call mixer and CTL call paths constructed are cancelled (step S50), and the call resource of the call mixer, CTL, and the switch allocated are withdrawn (step S51). Then, the call tapping cancellation is informed to the external system through the MMIU 11 (step S52).

Figure 8:
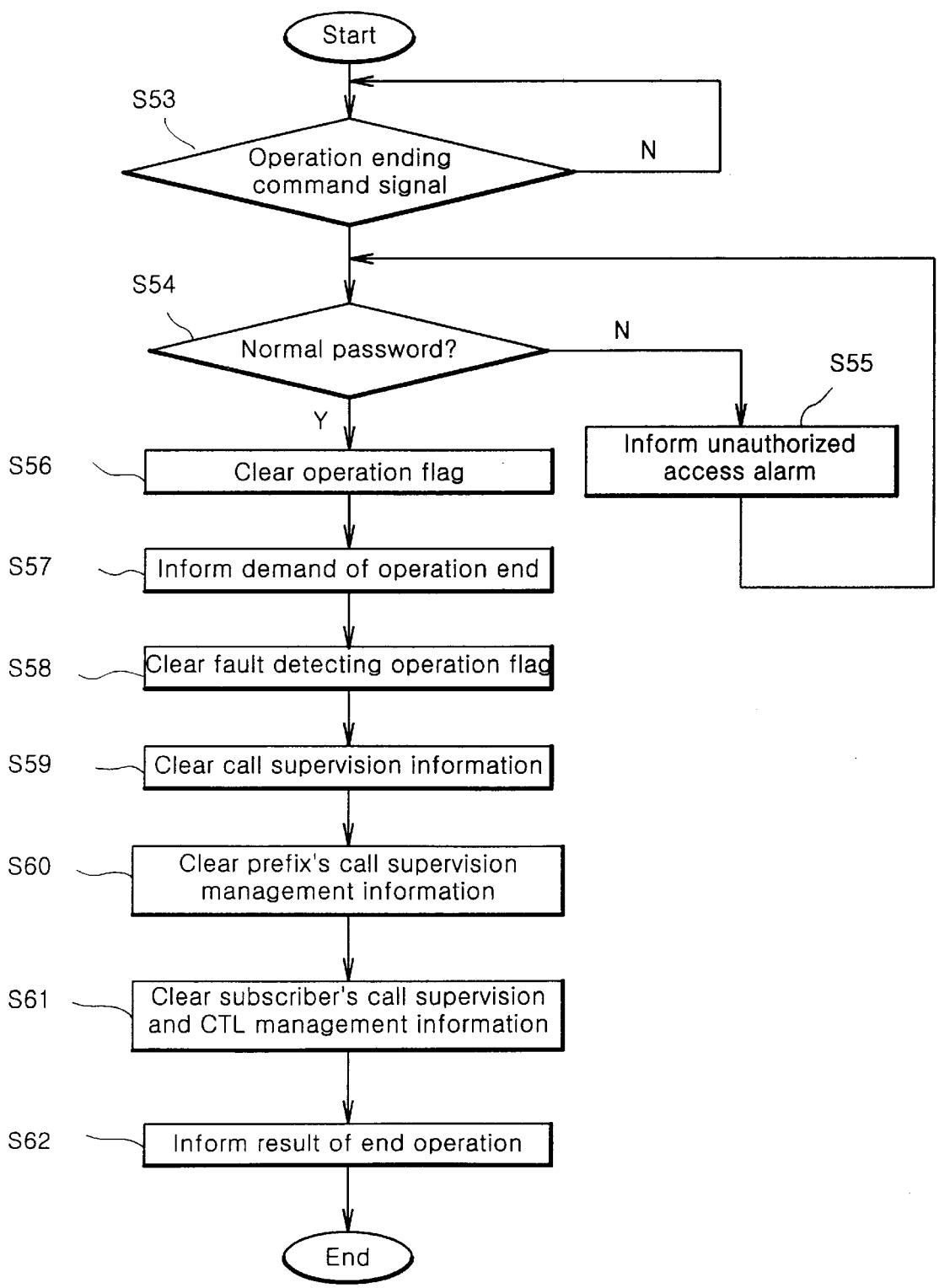
FIG. 8 is a flow chart showing an operation end of the call supervisory system in the exchange according to a preferred embodiment of the present invention.

The ending operation of the call supervisory system will now be described with reference to the flow chart shown in FIG. 8.

The MMIU 11 checks whether an operation ending command signal demanding end of the operation is received from the external system (step S53). If the call supervisory system receives the operation ending command signal from the external system at step S53, the MMIU 11 compares the password contained in s header of the operation ending command signal received from the external system to the password which has been registered in the local memory (step S54).

If the received password is different from the registered password, an unauthorized access alarm is sent to the external system (step S55). If the two passwords accord with each other, the operation flag of the call supervisory system which has been set at step S3 is cleared out (step S56), and the end of the operation of the call supervisory system is informed to the CTCU 12 and FACU 13 (step S57).

The FACU 13 receives the operation end information through the MMIU 11 and clears out the operation flag related to detection of fault in the call supervisory system, thereby to end its operation (step S58). The CTCU 12 clears out the call supervisory information stored in the memory (step S59). The CTCU 12 also sends the operation ending command signal to the NUTU 14 and the CTSU 15, thereby to control the end of their operation.

The NUTU 14 clears out the prefix call supervisory management information stored in the memory (step S60). The CTSU 15 clears out the subscriber call supervisory and CTL management information stored in the memory (step S61). Subsequently, the NUTU 14 and the CTSU 15 inform to the CTCU 12 completion of the clearing with respect to the memories and call supervisory operation flag. The CTCU 12 informs a result of the operation end of the call supervisory system to the external system through the MMIU 11 (step S62).

In short, the call supervisory system starts and ends its operation according to the demand of the external system. The MMIU 11 performs the function of registering and changing a password to prevent access of systems other than the external system. The CTSU 15 registers CTL management information in the CTL management database according to the control signal of the CTCU 12, thereby to form a CTL group between the external system and the call supervisory system. The CTCU 12 sends to the NUTU 14 and the CTSU 15, a control signal over the registration, removal, change of information, or inquiry with respect to call monitored and/or tapped objects. The NUTU 14 performs the registration, change of information, or removal of prefixes to be call-supervised in the NTP database. The CTSU 15 performs the registration, change of information, or removal of subscribers for the call supervision in the SSP database. Therefore, the call supervisory system of the present invention performs the registration, removal, change of information, or inquiry with respect to the call monitored and/or tapped objects, and the management of the registration databases according to the demand of the external system.

In addition, the call supervisory system starts or stops the call tapping operation according to the demand of the external system, and more specifically, performs automatic monitoring, inform, and tapping operations with respect to subscribers and prefixes registered for the monitoring and/or tapping. The call supervisory system has supervision capacity where 128 per 8192 general subscribers of the exchange having the relevant call supervisory system can be supervised, and simultaneously, 1024 external subscribers excepting for the subscribers of the exchange, the predetermined telephone numbers or prefixes which have been previously registered for the call monitoring and tapping, can be supervised. The capacity of the equipment used for the conference talking and CTL grouping is determined based upon the ratio of about 8192 to 28 with respect to the number of subscribers accommodated by the exchange. The call supervisory system also processes fault and manages statuses with respect to the software and hardware therein and informs the fault to the external system. Particularly, when the call supervisory system cannot normally operates because of serious fault therein, it informs the fault to the external system and is restarted by the demand of the external system. Accordingly, the present invention allows call monitoring and tapping by a control function of the exchange itself, thereby to perform call monitoring, tapping, and tracing through one connected process, thus effectively performing the function of the call supervisory system. It will be apparent to those skilled in the art that various modifications and variations can be made in the call supervisory system and method in the exchange of the present invention without deviating from the spirit or scope of the invention.

Thus, it is intended that the present invention covers the modifications and variations of this invention provided they come within the scope of the appended claims and their equivalents.

What is claimed is:

1. A call supervisory system in an exchange comprising:
   a trunk card device connected to a trunk card of an external system via a control trunk line;
   device control unit, as a lower level processor, for controlling the trunk card device;
   a man machine interface unit matched with the external system for switching data and managing a password;
   a call trace and path setup control unit for controlling the call supervisory system according to demands of the external system received through the man machine interface unit and informing a result of the relevant control to the external system via the man machine interface unit;
   a number translation unit for translating and managing an exchange number according to the control of the call trace and path setup control unit when processing calls;
   a call trace and path setup unit for setting up call supervision and a call path according to the control of the call trace and path setup control unit;
   a call management unit for performing a call process function of the exchange, sending a call supervision control flag to the number translation unit, and informing occurrence of call process events to the call trace and path setup unit;
   a fault control unit for controlling fault in the call supervisory system and informing contents of the fault to the external system via the man machine interface unit; and
   a telephony device maintenance unit for controlling maintenance and repair of speech path equipment according to the control of the fault control unit.

2. A call supervisory method in an exchange comprising the steps of:
   checking whether a call supervisory system is operative in response to an operation starting command signal;
   grouping control trunk lines (CTL) into specified CTL units according to a grouping command signal;
   identifying registration/non-registration and conformity/unconformity of each call supervised object and performing registration, removal, change of information, or inquiry with respect to each call supervised object; and
   performing call monitoring and tapping with respect to each call supervised object.

3. The method according to claim 2, further comprising the step of identifying normality of a password according to a password changing command signal and newly registering a new password in a memory.

4. The method according to claim 2, further comprising the step of clearing each memory stored call supervisory information and prefix or subscriber's call supervision and CTL management information and ending operation of the call supervisory system.

5. The method according to claim 4, wherein the call supervisory information contains a telephone number of a subscriber occurred a transmitting/receiving signal, current time, subscriber's registration rank, priority order, and CTL used during the call tapping.

6. The method according to claim 2, wherein each command signal consists of contents of command and a header including an identification number of each call supervisory system, length of the contents of command, command code, and a password.

7. The method according to claim 2, wherein a transmission message for informing results of performing each step to an external system contains contents of command and a header including an identification number of each call supervisory system, length of the contents of command, and message code.

8. The method according to claim 7, wherein a header format of the call supervisory information of the transmission messages contains a call identifier which is properly given to each subscriber or prefix registered for call supervision when performing the registration for the call supervision.

9. The method according to claim 2, wherein the step of checking whether the call supervisory system is operative comprises the steps of:

performing initialization in response to the operation starting command signal and registering a password in a memory;

setting an operation flag of the call supervisory system and informing a demand of operation start of the call supervisory system;

clearing each memory after identifying whether or not the call supervisory information is stored in each memory and preparing for performing the registration for the call supervision according to a demand of an external system; and identifying whether or not fault occurs in the call supervisory system and informing to the external system, contents of the fault or normality in the start operation.

10. The method according to claim 2, wherein the step of grouping the CTLs comprises the steps of:

checking normality of a password received from an external system in response to the grouping command signal;

registering a demand of grouping the CTLs in a CTL management local memory and a CTL management database; and grouping each CTL into each specified CTL group and informing a result of the grouping to the external system.

11. The method according to claim 2, wherein the step of grouping the CTLs further comprises the step of reading all the CTLs contained in the CTL group to be inquired from the CTL management local memory and transmitting them to the external system according to a demand of the external system or when inquiring a number of a CTL belonging to a particular CTL group.

12. The method according to claim 2, wherein the step of performing registration, removal, change of information, or inquiry with respect to the call supervised object comprises the steps of:

identifying normality of a password received from an external system in response to a command signal related to the call monitored and tapped object;

checking the call monitored and tapped object to find that the object is a subscriber to other system or to the call supervisory system concerned and identifying the registration/non-registration and conformity/unconformity of a relevant prefix or subscriber; and performing the registration, removal, change of information, or inquiry with respect to the call supervisory information in a call monitoring/tapping management local memory and a call process database according to the command signal related to the call monitored and tapped object and transmitting a performed result to the external system.

13. The method according to claim 2, wherein contents of the command signal related to the call monitored and tapped object comprise a type of each registered object, conditional number, digit(s) of subscriber's telephone number or the prefix, call supervision control method, CTL group number, and priority order.

14. The method according to claim 2, wherein the step of performing call monitoring and tapping comprises the steps of:

checking a call supervision registration flag and informing information related to occurrence of each call process event; and identifying a fact of registration for the call supervision from a memory and transmitting the call supervisory information to an external system by events.

15. The method according to claim 2, wherein the step of performing call monitoring and tapping further comprises the steps of:

inquiring of a memory to identify the registration for call supervision according to a call tapping command signal or when there occur call process events of busy state and answer for receiving signal;

checking whether subscriber's line is busy and identifying a call simultaneous monitoring and tapping registration rank;

allocating a call mixer, CTL, and switch resource and resetting calls in the call mixer; and performing tapping of calls after setting paths of each call in the call mixer and CTL and transmitting a result of the tapping to the external system.

16. The method according to claim 15, wherein the call tapping command signal includes a call identifier.

17. The method according to claim 15, wherein the call path is established as a three-party talking type using conference talking equipment and is designed to have one-way feature.

18. The method according to claim 2, further comprising the step of canceling the paths of each call in the call mixer and CTL according to a call tapping canceling command signal or when there occurs a call process event of call disconnection, withdrawing the allocated call mixer, CTL, and switch resource, and informing call tapping cancellation to the external system.

19. The method according to claim 18, wherein the call tapping canceling command signal includes a call identifier and CTL number.

20. The method according to claim 2, wherein the step of ending operation of the call supervisory system comprises the steps of:

identifying normality of a password received from an external system in response to the operation ending command signal;

informing a demand of ending the operation of the call supervisory system after clearing the operation flag; and clearing a system fault detection operation flag, call supervisory information, prefix's call supervision management information, and subscriber's call supervision and CTL management information stored in each memory and informing a result of the ending operation to the external system.

* * * * *